Oct. 18, 1955 M. N. FRANKLIN 2,721,250
INERT GAS WELDING TORCH NOZZLE
Filed Jan. 15, 1953
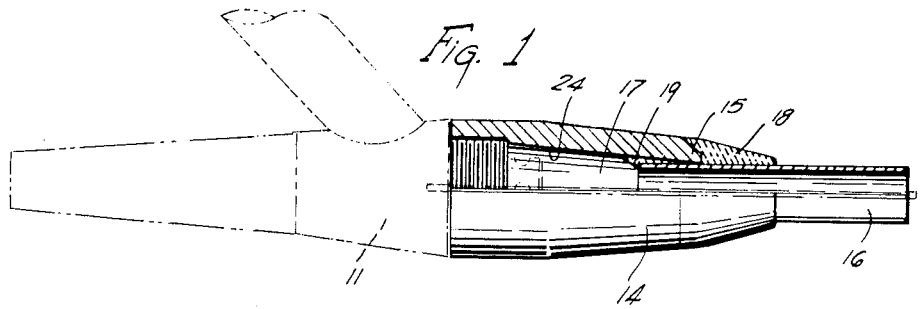
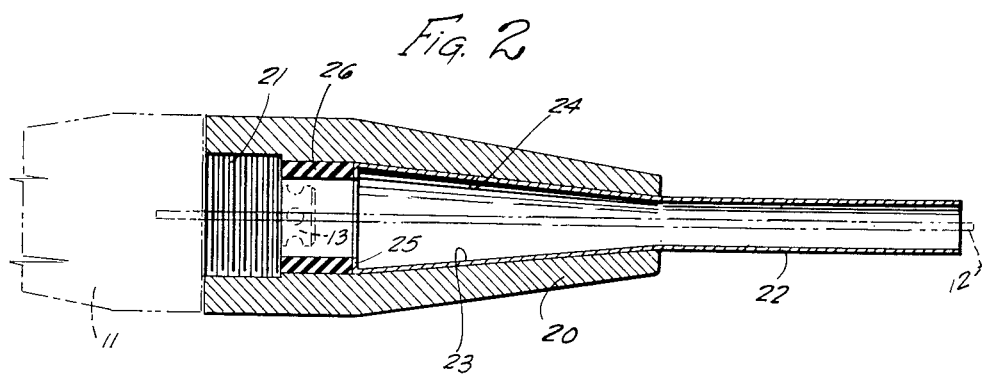
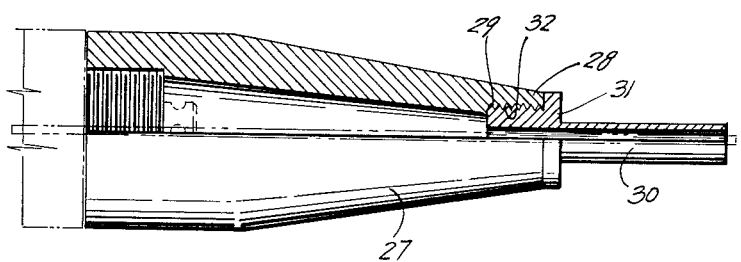
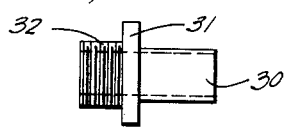
INVENTOR.
MILTON N. FRANKLIN
BY
*F. J. Schmitt*
*H. H. Gearinger*
ATTORNEYS

United States Patent Office 2,721,250
Patented Oct. 18, 1955

2,721,250

INERT GAS WELDING TORCH NOZZLE

Milton N. Franklin, Philadelphia, Pa.

Application January 15, 1953, Serial No. 331,521

2 Claims. (Cl. 219—14)

(Granted under Title 35, U. S. Code (1952), sec. 266)

The invention described herein may be manufactured and used by or for the Government of the United States of America for governmental purposes without the payment of any royalties thereon or therefor.

This invention relates to the art of welding and specifically to improved welding torch nozzles for inert gas welding with non-depositing electrodes. The invention contemplates the provision of a thin-walled metallic extension tip for a ceramic torch cup which will permit use of the torch in relatively restricted places without impairing gas coverage of the weld.

In order to produce a stronger, more ductile weld in arc welding, the weld is shielded from the atmosphere while said weld is at the high temperature produced by the arc by directing a stream of an inert gas such as helium onto the weld through an opening in the torch nozzle surrounding the arcing electrode. The torch nozzles are commonly made of ceramic material because of the conditions encountered in welding and this material, because of its brittleness, requires a certain wall thickness which results in a rather bulky nozzle. Since good welding technique requires that the welding electrode be extended no more than the the thickness of the electrode beyond the torch nozzle in order to get proper gas coverage, welding in relatively restricted places becomes difficult or impossible using the conventional ceramic cup tip. In addition, the work is blocked from the view of the welder, rendering the welding operation even more difficult. Applicant has found that a metallic extension of copper, for example, of relatively small outside diameter can be attached to the ceramic cup providing a torch which can be used in close quarters without impairing gas coverage of the weld and without damage to the extension itself.

It is an object of this invention to provide a welding torch nozzle tip for use in relatively restricted locations inaccessible with conventional equipment.

A further object of this invention is to show how the improved nozzle tip can be applied to known ceramic cup nozzles without necessitating any modification of the cups.

Still another object of this invention is to teach a means of salvaging broken or discarded ceramic torch cups to construct the improved device.

Other objects and many of the attendant advantages of this invention will be readily appreciated as the same becomes better understood by reference to the following detailed description when considered in connection with the accompanying drawings wherein:

Figure 1 shows one form of the invention in which the extension tubing is joined to a salvaged ceramic cup using a mixture of waterglass and asbestos;

Figure 2 illustrates an embodiment of the invention wherein an insulating ring is employed to hold a flared extension tip in place in a conventional ceramic cup nozzle;

Figure 3 is a drawing of another form of the invention in which the ceramic cup is provided with internal threads for engaging threads formed on interchangeable extension tips and Figure 4 shows one of the interchangeable tips in elevation.

The numeral 11 designates an arc welding torch used for welding with a non-depositing rod or electrode 12. A gas jet 13 surrounding the rod releases a controlled quantity of an inert gas, such as helium, upon the weld. This gas protects the weld from the effects of the atmosphere which would cause the weld to become porous and brittle in the absence of this shielding. In Figure 2 is shown a conventional ceramic torch cup 20 internally threaded as at 21 to receive the threaded end of the welding torch and direct the inert gas upon the weld being made. Because of their brittle nature these cups are often broken and become useless for welding. The form of the invention shown in Figure 1 may be a means of salvaging these broken cups and at the same time improving the torch nozzle to make the torch a more versatile tool.

In Figure 1 is shown a modified ceramic cup 14 which has been ground smooth at its end 15. A cup which has a broken end may be salvaged for this purpose, whereby a considerable savings in cost may be effected. A length of copper tubing 16 is inserted in the bore 17 of the ceramic cup and a seal effected between the ceramic and the tubing by applying a mixture of water glass and ground asbestos as at 18 and 19. Although a straight walled piece of tubing is shown, it is obvious that the extension could be flared to provide a close fit with the inner wall 24 of the ceramic cup or to permit use of a smaller diameter tubing with a given cup.

This modified torch nozzle permits use of the torch in relatively inaccessible places on a work piece which could not be reached and efficiently welded with the blunt, thick-walled conventional ceramic cup tip. Applicant has successfully employed torch nozzles covered by this invention on work requiring welding rod up to 3/16 inch in diameter. Care must be taken to provide clearance between the rod and the extension tubing to prevent arcing from the tubing to the workpiece.

The species of the invention shown in Figure 2 utilizes the conventional ceramic cup nozzle with an extension piece 22. The extension tube is made with an inwardly flaring portion 23 which conforms to the inner wall 24 of the ceramic cup and terminates in an annular shoulder or abutment 25. An annular spacing ring or washer 26 of an insulating material is provided to space the end of the extension piece from the torch nozzle and to maintain said extension in place within the ceramic cup when the cup is threaded onto the end of the torch. The washer is proportioned to provide sufficient clearance around the gas jet so as not to interfere with the passage of the protecting gas through the torch nozzle. When the ceramic cup is threaded onto the torch, the end of the torch abuts the washer 26 pushing it against the abutment 25 which forces the flared portion 23 of the extension into tight engagement with the inner wall 24 of the ceramic cup, effecting a gastight seal.

Figure 3 shows still another modification of the invention wherein the conventional ceramic cup is replaced by a cup 27 provided with internal threads 29 at its end 28. The extension tips 30 intended for use with this type ceramic cup are provided with mating threads 32 and a flange 31 which seats against the end of the ceramic cup. No additional parts or seals are required in this embodiment. Different sizes and lengths of copper or other metallic extension tubes may be provided as shown in Figure 4 and employed interchangeably with the same ceramic cup. This provides an added measure of convenience and expediency on certain jobs where it may be necessary to use different sizes and lengths of extensions.

As can readily be seen, the device disclosed by applicant provides a convenient and practical solution to the problem presented when relatively small, complex workpieces are to be welded and where welding with known torch nozzles would be difficult or even impossible. In many cases in the past it was necessary to completely redesign a workpiece at great expense of time and money in order to provide clearance for welding. With applicant's improved torch nozzles, a simple, quick operation converts a conventional torch into a versatile tool which can readily perform hitherto impossible welding operations.

It is also noteworthy that in the embodiments of Figures 2 and 3 the extension tubing can be easily removed and the torch used for ordinary welding operations.

Obviously many modifications and variations of the present invention are possible in the light of the above teachings. It is therefore to be understood that within the scope of the appended claims the invention may be practiced otherwise than as specifically described.

What is claimed is:

1. In an inert gas arc-welding torch tip, a hollow, cone-shaped ceramic torch cup to be attached at one end to a torch, a metallic thin-walled tubular extension extending beyond the free end of the torch cup, said tubular extension being provided with a portion having an outer cone-shaped wall matching the inner wall of said torch cup, an inturned flange at the free end of said cone-shaped wall and a hollow, cylindrical insulating ring lying within the ceramic cup and being of a length to abut the torch and said inturned flange to thereby urge the cone-shaped wall into tight engagement with the inner wall of said torch cup when said torch tip is in assembled relation with the torch.

2. In an inert gas arc-welding torch tip, a hollow ceramic torch cup to be attached at one end to a torch, the inner wall of the torch cup tapering inwardly toward its free end, a thin-walled tubular extension extending beyond the free end of the torch cup, said tubular extension being provided with a portion having an outer cone-shaped wall matching the inner wall of said torch cup and an annular insulating ring lying within the ceramic cup between the end of said portion and the end of the cup which is to be attached to a torch, said insulating ring being of a length to abut the torch and the end of the extension when said torch tip is in assembled relation with the torch to thereby urge the cone-shaped wall into tight engagement with the inner wall of said torch cup.

References Cited in the file of this patent

UNITED STATES PATENTS

| | | |
|---|---|---|
| 1,959,194 | Chapman | May 15, 1934 |
| 2,612,584 | Morrissey | Sept. 30, 1952 |